(12) United States Patent
Lebas et al.

(10) Patent No.: US 12,210,816 B2
(45) Date of Patent: Jan. 28, 2025

(54) METHOD AND DEVICE FOR OBTAINING A RESPONSE TO AN ORAL QUESTION ASKED OF A HUMAN-MACHINE INTERFACE

(71) Applicant: AIRUDIT, Pessac (FR)

(72) Inventors: Philippe Lebas, Talence (FR); Antoine Sottiau, Talence (FR); Mathilde Couraud, Talence (FR); Florian Boyer, Talence (FR)

(73) Assignee: AIRUDIT, Pesssac (FR)

(*) Notice: Subject to any disclaimer, the term of this patent is extended or adjusted under 35 U.S.C. 154(b) by 309 days.

(21) Appl. No.: 17/597,108

(22) PCT Filed: Jun. 17, 2020

(86) PCT No.: PCT/FR2020/051042
§ 371 (c)(1),
(2) Date: Mar. 10, 2022

(87) PCT Pub. No.: WO2020/260797
PCT Pub. Date: Dec. 30, 2020

(65) Prior Publication Data
US 2022/0269850 A1  Aug. 25, 2022

(30) Foreign Application Priority Data
Jun. 27, 2019  (FR) ...................................... 1906997

(51) Int. Cl.
*G06F 40/166* (2020.01)
*G06F 40/279* (2020.01)
(Continued)

(52) U.S. Cl.
CPC .......... *G06F 40/166* (2020.01); *G06F 40/279* (2020.01); *G06F 40/30* (2020.01); *G10L 15/1815* (2013.01); *G10L 15/22* (2013.01)

(58) Field of Classification Search
CPC ...... G06F 40/166; G06F 40/279; G06F 40/30; G10L 15/1815; G10L 15/22
See application file for complete search history.

(56) References Cited

U.S. PATENT DOCUMENTS 11,086,857 B1 * 8/2021 Ganu ................. G06F 16/24522
11,526,512 B1 * 12/2022 Halabi .................. G06F 40/289
(Continued)

OTHER PUBLICATIONS

Pinter, Yuval, Robert Guthrie, and Jacob Eisenstein. "Mimicking word embeddings using subword RNNs." arXiv preprint arXiv:1707.06961 (2017). (Year: 2017).*
(Continued)

*Primary Examiner* — Brian L Albertalli
(74) *Attorney, Agent, or Firm* — TraskBritt

(57) ABSTRACT

A method for modifying a voice-signal transcription generated by an automatic speech recognition engine from a voice signal, prior to a generation of a response by a semantic engine equipped with at least one ontology comprising a vocabulary space, from an injection of a question, comprises the following steps: determining the set of all of the words of the transcription not belonging to the space, and for each word of the determined set: a step of word-embedding of the word in the space; determining semantic distances between the embedding and each of the words of the space; a step of selecting at least one word of the space; and modifying the transcription by replacing the word of the transcription with at least one selected word in order to generate a modified signal transcription.

6 Claims, 1 Drawing Sheet

(51) Int. Cl.
    *G06F 40/30*    (2020.01)
    *G10L 15/18*    (2013.01)
    *G10L 15/22*    (2006.01)

(56)     References Cited

U.S. PATENT DOCUMENTS

| | | | | |
|---|---|---|---|---|
| 11,580,145 | B1* | 2/2023 | Kumar | G06N 3/092 |
| 2013/0030804 | A1* | 1/2013 | Zavaliagkos | G10L 15/24 |
| | | | | 704/235 |
| 2015/0058006 | A1* | 2/2015 | Proux | G10L 15/26 |
| | | | | 704/235 |
| 2017/0161275 | A1* | 6/2017 | Speer | G06F 16/24522 |
| 2017/0185375 | A1 | 6/2017 | Martel et al. | |
| 2017/0286397 | A1* | 10/2017 | Gonzalez | G06F 40/211 |
| 2018/0137855 | A1* | 5/2018 | Lee | G10L 15/16 |
| 2019/0027133 | A1* | 1/2019 | Georges | G10L 15/193 |
| 2019/0066668 | A1* | 2/2019 | Lin | G10L 15/22 |
| 2019/0188263 | A1* | 6/2019 | Ock | G06F 40/247 |
| 2020/0042643 | A1* | 2/2020 | Carrier | G06N 5/01 |
| 2020/0050667 | A1* | 2/2020 | Lin | G06F 16/35 |
| 2020/0097814 | A1* | 3/2020 | Devesa | G10L 15/1815 |
| 2020/0251096 | A1* | 8/2020 | Audhkhasi | G10L 15/16 |
| 2020/0335096 | A1* | 10/2020 | Li | G06N 3/04 |
| 2022/0172713 | A1* | 6/2022 | Kwatra | G10L 15/26 |

OTHER PUBLICATIONS

Bahdanau, Dzmitry, et al. "Learning to compute word embeddings on the fly." arXiv preprint arXiv:1706.00286 (2017). (Year: 2017).*

Bertaglia, Thales Felipe Costa, and Maria das Graças Volpe Nunes. "Exploring word embeddings for unsupervised textual user-generated content normalization." arXiv preprint arXiv:1704.02963 (2017). (Year: 2017).*

Garneau, Nicolas, Jean-Samuel Leboeuf, and Luc Lamontagne. "Predicting and interpreting embeddings for out of vocabulary words in downstream tasks." arXiv preprint arXiv:1903.00724 (2019). (Year: 2019).*

Haddad, Hesam, Hakimeh Fadaei, and Heshaam Faili. "Handling OOV words in NMT using unsupervised bilingual embedding." 2018 9th International Symposium on Telecommunications (IST). IEEE, 2018. (Year: 2018).*

Kolachina, Prasanth, Martin Riedl, and Chris Biemann. "Replacing OOV words for dependency parsing with distributional semantics." Proceedings of the 21st Nordic conference on computational linguistics. 2017. (Year: 2017).*

International Search Report for International Application No. PCT/FR2020/051042 dated Aug. 6, 2020, 2 pages.

International Written Opinion for International Application No. PCT/FR2020/051042 dated Aug. 6, 2020, 6 pages.

Jayawardana et al., Word Vector Embeddings and Domain Specific Semantic Based Semi-Supervised Ontology Instance Population, International Journal on Advance in ICT for Emerging Regions, (2017), vol. 10, No. 1, 11 pages.

Ling et al., Finding Function in Form: Compositional Character Models for Open Vocabulary Word Representation, Proceedings of the 2015 Conference on Empirical Methods in Natural Language Processing, (Sep. 2015), pp. 1520-1530.

* cited by examiner

METHOD AND DEVICE FOR OBTAINING A RESPONSE TO AN ORAL QUESTION ASKED OF A HUMAN-MACHINE INTERFACE

CROSS-REFERENCE TO RELATED APPLICATIONS

This application is a national phase entry under 35 U.S.C. § 371 of International Patent Application PCT/FR2020/051042, filed Jun. 17, 2020, designating the United States of America and published as International Patent Publication WO 2020/260797 A1 on Dec. 30, 2020, which claims the benefit under Article 8 of the Patent Cooperation Treaty to French Patent Application Serial No. 1906997, filed Jun. 27, 2019.

TECHNICAL FIELD

The present disclosure relates to a method for obtaining a response from an oral question asked of a human-machine interface. The present disclosure also relates to a device configured to obtain a response of this kind.

BACKGROUND

Automatic word recognition is a computing technique that makes it possible to analyze the human voice picked up by way of a microphone, in order to transcribe it in the form of a text that can be used by a machine. Speech recognition, as well as speech synthesis, speaker identification or speaker verification, are among speech processing techniques. These techniques, in particular, make it possible to implement human-machine interfaces HMI where some of the interaction takes place by voice. These interfaces can be referred to by the term "vocal interfaces." Automatic speech recognition is a complex field, since there is a significant difference between formal language, which is understood and used by the machines, and natural language, which humans use. Formal language is structured by strict syntactical rules, without ambiguity. Vice versa, in natural language words or phrases may have different meanings according to the speaker's intonation or the context, for example.

Automatic speech recognition engines are known, which are referred to in the following as ASR engines. A speech signal is injected into an automatic speech recognition engine. In ASR formalization, the functional separation is as follows:
- an acoustic treatment (front-end) makes it possible to extract from a voice signal, also referred to as a speech signal, a compact acoustic image in the form of acoustic vectors corresponding to sections of 20 to 30 ms of signal at steps of 10 ms. The signal is digitized and parametrized by a way of a frequential analysis technique using the Fourier transform (for example, MFCC, Mel-Frequency Cepstral Coefficients).
- automatic learning achieves an association between the elementary segments of the speech and lexical elements. This association calls on statistical modelling, inter alia by Hidden Markov Models (HMM) and/or by Artificial Neural Networks (ANN).
- decoding, by concatenating the elementary models previously learned, reconstructs the most probable discourse. This is thus temporal pattern matching, often achieved by the dynamic time warping (DTW) algorithm.

Thus, an ASR engine is thus equipped with a vocabulary space that includes all the vocabulary accepted by the ASR engine, i.e., the set of all the lexical elements cited above.

Furthermore, semantic analysis engines are known, referred to hereinafter as MS engines. Semantic engines of this kind are also referred to by the term NLU system, for Natural-Language Understanding System.

The semantic analysis engines aim to generate a response to a question posed. For this purpose, the semantic analysis engines comprise one or more ontologies and determine, when a question is posed, the ontology to implement in order to provide a response to the question posed.

In computing and in information science, an ontology is the structured set of terms and concepts representing the meaning of a field of information, whether by the metadata of a name space, or the elements of a field of knowledge. The ontology constitutes, in itself, a data model that is representative of a set of concepts in a given field, as well as the relations between the concepts. An ontology is used for reasoning about objects of the field in question. The concepts are organized in a graph, the relations of which may be semantic relations or subsumption relations.

An ontology makes it possible to model a set of knowledge in a given domain, which may be real or imaginary. The ontologies are used as a form of representation of the knowledge of a domain or a certain part of a domain, in varied fields such as those of artificial intelligence, the Semantic Web, software engineering, biomedical computing, or indeed information architecture.

The ontologies generally describe:
classes: sets, or types of objects;
individuals: occurrence of classes, knowledge, objects;
attributes: properties, functionalities, characteristics, or parameters that the objects may possess and share;
relations: the links that the objects may have between themselves;
events: changes that the attributes or relations undergo; and
metaclass (Semantic Web): collections of classes that share certain characteristics.

Thus, an MS engine, provided with an ontology, is equipped with a vocabulary space associated with the ontology, which includes all the vocabulary accepted by the MS engine, i.e., the set of all the previously denoted individuals of the ontology retained by the MS engine.

The problem addressed by the present disclosure is part of the general problem of providing a response, by an MS engine, to an oral question posed and digitized in the form of a voice signal.

In the present description, an ontology targets a set of technical data provided with classes that form the peaks of a graph, and relations forming the edges between the peaks of the graph, the ontology being implemented in digital form. The set of data can furthermore, in particular, comprise metadata, or syntactic or linguistic indices.

The ontology can be stored digitally in the form of computer files, for example, in XML format.

In the prior art, the methods aiming to respond to the general question comprise a step of generation, by an ASR engine, of a voice-signal transcription from a voice signal, then generation of a response by an MS engine starting from the question formed by the transcribed voice signal.

Since each of the ASR and MS engines is equipped with a vocabulary that is independent of the other, it is understood that the processing chain implemented can function only for the lexicon common to the two vocabularies.

An immediate solution that can be envisaged is to complete each of the vocabularies of the engines by only the known lexicon of the other of the two engines. However, a solution of this kind is difficult to implement, since it requires supplementation of each of the vocabularies from the time that a new term appears.

BRIEF SUMMARY

An aim of the present disclosure, in particular, is that of overcoming all or some of the above-mentioned disadvantages. According to a first aspect of the present disclosure, a method for generating a response to a voice signal is proposed, preferably merely implementing technical means, from a voice-signal transcription generated by an automatic speech recognition engine from the voice signal, comprising generation of the response by a semantic engine from an injection of a question, the semantic engine being equipped with at least one ontology comprising a vocabulary space, the question being determined from pretreatment of the transcription of the voice signal, the pretreatment comprising, for each of the words of the transcription of the voice signal not belonging to the vocabulary space, a step of word-embedding of the word in the vocabulary space, determining a measure of similarity between the word-embedding of the word and each of the words of the vocabulary space, a step of selecting at least one word of the vocabulary space, replacing the word of the transcription with the at least one selected word in order to form the question.

The word-embedding of the word not belonging to the vocabulary space is word-embedding on the fly, by composition. A reference article included in the present disclosure is "Finding Function in Form: Compositional Character Models for Open Vocabulary Word Representation," by Wang Ling, Chris Dyer, Alan W Black, Isabel Trancoso, Ramón Fernandez, Silvio Amir, Luís Marujo, Tiago Luís, pages 1520-1530 in *Proceedings of the 2015 Conference on Empirical Methods in Natural Language Processing*.

The modification method may comprise an intermediate step between the step of word-embedding of the word not belonging to the vocabulary space, and the selection step, the intermediate step comprising statistical modelling of the semantic connections made between the user terms and the concepts defined in the semantic engine, based on a corpus of user requests. In this case, the semantic connections correspond to the semantic relations between the classes and individuals of the ontology. The use of a user request corpus makes it possible to both generate new relations, but also to weight the relations. The weight assigned to each relation can be estimated by a recovery method, using the relative frequency of each concept, for example. As a result, a relation rarely represented in the user requests will thus be weighted lightly, and vice versa. The method for recovery and interpolation between the weights is determined such that a relation having a very low weighting can be considered. A weighting can be obtained by a simple probabilistic model. If one considered, for the training phase, a set of questions that users have already posed to a human/machine dialog system, using a model of the word2vec type, the weighting can take account of the average of the vectors of words for each phrase, in order to group together the similar phrases. In this way, a probabilistic model can be defined by calculating the probability of the occurrence of each phrase.

The step of selecting at least one word of the vocabulary space may comprise a selection algorithm taking, as the input, the known N-words of the semantic engine that are semantically closest to the known word, and proposing one or more replacement terms, given several criteria that can be managed by the user, such as the probability of the request/question considering the user's experience, and the estimated cost for resolving the question/request considering the semantic connections. Given a statistical model of semantic connections of which the relations are weighted, it is possible to evaluate, based on the semantic distance, a cost for each phrase having a replacement term, by adding the weights of the path taken in the model. Other cost evaluations are possible.

According to a second aspect of the present disclosure, a computer program product is proposed, which can be downloaded from a communications network and/or stored on a computer-readable medium and/or executed by a microprocessor, and which can be loaded into an internal memory of a calculation unit, wherein it comprises program code instructions that, when executed by the calculation unit, implement the steps of the method according to the first aspect of the present disclosure or one or more of the improvements thereof.

According to a third aspect of the present disclosure, a method for generating a response to a voice signal is proposed, comprising a step of generating a voice-signal transcription by way of an automatic speech recognition engine from words, starting from a voice signal, and generating the response by way of a semantic engine from an injection of a question, the semantic engine being equipped with at least one ontology comprising a vocabulary space, the method further comprising the modification of the voice-signal transcription according to the first aspect of the present disclosure, or one or more of the improvements thereof, so as to obtain a modified signal transcription, the question injected into the semantic engine being the modified transcription.

According to a fourth aspect of the present disclosure, a computer program product is proposed, which can be downloaded from a communications network and/or stored on a computer-readable medium and/or executed by a microprocessor, and which can be loaded into an internal memory of a calculation unit, wherein it comprises program code instructions that, when executed by the calculation unit, implement the steps of the method for generating a response to a signal according to the third aspect of the present disclosure or one or more of the improvements thereof.

According to a fifth aspect of the present disclosure, a device is proposed for modifying a voice-signal transcription generated by an automatic speech recognition engine from a voice signal, prior to a generation of a response by a semantic engine from an injection of a question, the semantic engine being equipped with at least one ontology comprising a vocabulary space Vms, the modification device being configured for:
- determining the set of all of the words of the voice-signal transcription not belonging to the vocabulary space, and
- for each word of the determined set:
  i. performing word-embedding of the word in the vocabulary space,
  ii. determining semantic distances between the word-embedding of the word and each of the words of the vocabulary space,
  iii. selecting at least one word of the vocabulary space,
  iv. modifying the transcription by replacing the word of the transcription with the at least one selected word in order to generate a modified signal transcription.

According to a sixth aspect of the present disclosure, a system for generating a response to a voice signal is proposed, comprising:
- an automatic speech recognition engine configured to generate a voice-signal transcription from the voice signal,
- a semantic engine configured to generate the response from in response to an injection of a question, the semantic engine being equipped with at least one ontology comprising a vocabulary space, and
- a device according to the fifth aspect of the present disclosure or one or more of the improvements thereof, configured to generate a modification of the signal transcription, and to inject the modified transcription into the semantic engine.

BRIEF DESCRIPTION OF THE DRAWINGS

Other advantages and features of the present disclosure will emerge from reading the detailed description of implementations and embodiments, which are in no way limiting, in view of the accompanying drawings, in which.

DETAILED DESCRIPTION

Since the embodiments described in the following are in no way limiting, it is possible, in particular, to envisage variants of the present disclosure that comprise only a selection of features described in the following, in a manner isolated from the other features described, if this selection of features is sufficient for providing a technical advantage or for distinguishing the present disclosure from the prior art. This selection comprises at least one feature, preferably functional and without structural details, or having some of the structural details if this part alone is sufficient for providing a technical advantage or for distinguishing the present disclosure from the prior art.

In the figures, an element that appears in several figures is provided with the same reference sign.

An embodiment of a system 100, as well as an embodiment of a method M for generating a response A to a voice signal Sv, are described at the same time in the following, with reference to the drawings.

Figure 1:
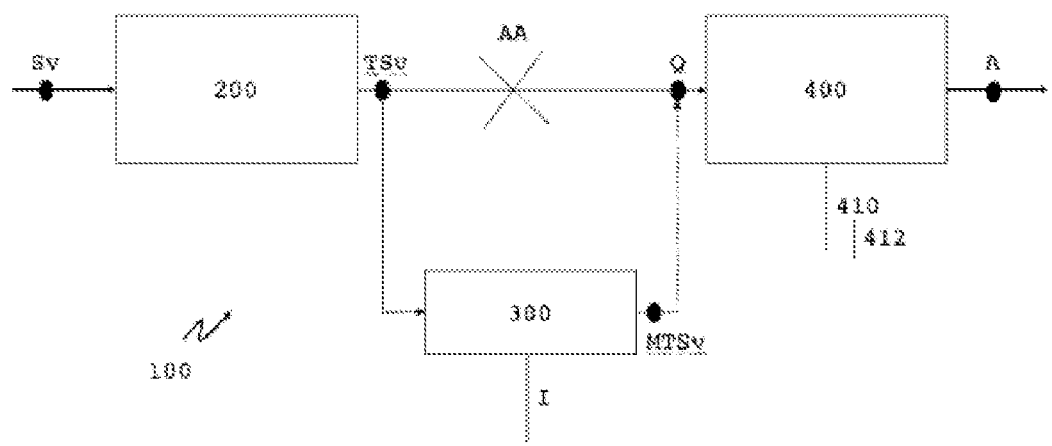
FIG. 1 schematically shows a system for generating a response to a voice signal according to the present disclosure.
Figure 2:
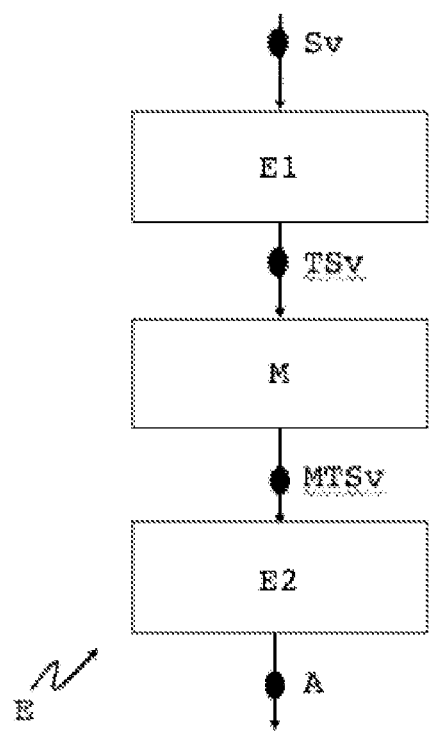
FIG. 2 schematically shows a method for generating a response to a voice signal according to the present disclosure.

FIG. 1 shows an embodiment of a system 100 for generating the response A to the voice signal Sv.

The system 100 comprises an automatic speech recognition engine 200 configured to generate, during a step E1, a voice-signal transcription TSv from the voice signal Sv.

It is possible, for example, to use the Kaldi toolkit or the CMU Sphinx collection of software and tools in order to construct, or interact with, the speech recognition engine 200. It is also possible, in the case of the embodiment of an "end-to-end" speech recognition engine, to use the TensorFlow or PyTorch deep learning software frameworks, or to rely on a toolkit such as ESPNet, which proposes training methods for various models of this kind.

The system also comprises a semantic engine 400, which is configured to generate, during a step E2, the response A in response to an injection of a question Q.

The semantic engine 400 is equipped with at least one ontology Oms, labelled with reference numeral 410, comprising a vocabulary space Vms, labelled with reference numeral 412.

It is possible, for example, to create a system made up of: an ontology made up using Protégé, comprising knowledge to restore; a natural language processing stack based on the Stanford NLP tools, and a machine learning system such as BERT, trained to associate a sequence of input words with possible knowledge present in the ontology.

According to the prior art, the voice-signal transcription TSv is used as a question Q to be injected into a semantic engine 400 and to obtain the response A. This step is modelled by the barred arrow AA.

Differently from the prior art, the system 100 further comprises a device 300 for modifying, during a step M, the voice-signal transcription TSv, functionally interposed between the automatic speech recognition engine 200 and the semantic engine 400.

More precisely, the device 300 receives, at the input, the voice-signal transcription TSv, generated by the automatic speech recognition engine 200, from a voice signal Sv. Prior to the generation of the response A by the semantic engine 400 from the injection of the question Q, the semantic engine being equipped with the ontology 410 comprising the vocabulary space Vms, the modification device is configured for:
- determining the set I of all of the words of the voice-signal transcription TSv not belonging to the vocabulary space 412, which can be written:

$I=\{x \in TSv, x \notin Vms\}$

- for each word of the determined set:
  - performing word-embedding of the word in the vocabulary space,
  - determining semantic distances between the word-embedding of the word and each of the words of the vocabulary space embedded in the vocabulary space,
  - selecting at least one word of the vocabulary space, the selection being made from the semantic distances determined,
- modifying the transcription TSv by replacing the word of the transcription with the at least one selected word in order to form the modified transcription MTSv.

Embedding a word in a vocabulary space is a well-known technique.

"Word-embedding," or also lexical embedding, is a training method of a representation of words used, in particular, in automatic processing of languages.

This technique makes it possible to represent each word of a dictionary by a corresponding vector of real numbers. This facilitates the semantic analysis of the words. Two approaches for encoding the context (the vicinity) of a word are distinguished. The frequency-based approaches count the words that co-occur with a given word, and then distill this information so as to create dense, small vectors. An example is latent semantic analysis. Word-embedding constitutes a second approach by which it is attempted to predict a given mode, using its context, and vice versa. This is the process that creates the word-embedding. A popular implementation of the calculation of word-embedding is provided by Tomas Mikolov in his program word2vec.

The general idea is to project a set of words of a vocabulary of size V in a vector space, where the vectors of the words are of a relatively small size N. Moreover, the vector representation of each word of V must be determined such that the words having similar representations appear in similar contexts. Researcher Tomas Mikolov's approach is based on artificial neural networks for constructing the vectors. These models are trained on high-volume corpuses.

It is possible, for example, to use the group of models word2vec or GloVE, which can be implemented in a deep learning computer library such as TensorFlow or PyTorch, in order to implement all the word-embedding of the present disclosure. Within the scope of implementing word-embedding by composition, it is possible to use the library Java Neural Network (JNN), implemented by the authors, or to use the preceding deep learning computer libraries for personalized implementation. In particular, the device for modifying the voice-signal transcription TSv generated by the automatic speech recognition engine 200 from the voice signal Sv can be configured to determine, during an initial step, the word-embedding, in the vocabulary space Vms, of each of the words of the vocabulary space Vms, for example, by calling up the command word2vec as many times as necessary.

EXAMPLE

It is supported that a user produces the voice signal Sv "family of canines," which is correctly transcribed by the automatic speech recognition engine 200 into a voice-signal transcription TSv.

Usually, the signal TSv is addressed to the semantic engine 400 as a question Q.

When the semantic engine 400 does not include the word "canine" in its vocabulary space Vms associated with the ontology used, in the present case an animal ontology, it is not capable of processing the words.

Even so, the vocabulary Vms associated with the ontology can include the words "Canidae," associated with other words, which are the genera "*Atelocynus cabrera,*" "*Canis linnaeus,*" "*Cerdocyon* Hamilton-Smith," "*Chrysocyon,*" etc.

Thus, when a user produces the question Q in the form of a voice-signal transcription TSv "what are the genera of the family of the canines," the semantic engine 400 cannot provide an adequate response, although the responses are known.

The method according to the present disclosure comprises the following steps, during step M:
  during an initial step, for each of the words of the vocabulary space Vms, the result of the word-embedding of the word in the vocabulary space, i.e., each of the words "Canidae," but also "*Atelocynus cabrera,*" "*Canis linnaeus,*" "*Cerdocyon* Hamilton-Smith," "*Chrysocyon,*" etc., is calculated.
  the set I of all of the words of the voice-signal transcription not belonging to the vocabulary space is determined: I="canine,"
  the word "canine" is word-embedded, into the vocabulary space, by composition,
  the semantic distances and/or other measures of similarity between the word-embedding of the word and each of the words of the vocabulary space is determined,
  a word of the vocabulary space that is closest, in this case the word "canidae," is determined, and
  the transcription is modified by replacing the word of the transcription with the at least one word in order to obtain a modified signal transcription MTSv: "what are the genera of the family of the Canidae."

The transcription of the modified signal is then injected, as a question Q, into the semantic engine 400, and the adequate response A is obtained.

Example

It is supposed that a user produces the voice signal Sv "Where can I bunk cheaply?", which is correctly transcribed by the automatic speech recognition engine 200 into a voice-signal transcription TSv.

Usually, the signal TSv is addressed to the semantic engine 400 as a question Q.

When the semantic engine 400 does not include the word "bunk" in its vocabulary space Vms associated with the ontology used, in the present case a hotel and catering ontology, it is not capable of processing the request.

Even so, the vocabulary Vms associated with the ontology can include the words "sleep," "have a meal," "stay," associated with the class "hotel and catering service."

Thus, when a user produces the question Q associated with the voice signal Sv, the semantic engine 400 cannot provide an adequate response, although the responses are known.

The method according to the present disclosure comprises the following steps, during step M:
  during an initial step, for each of the known words of the vocabulary space Vms, the result of the word-embedding of the word in the vocabulary space, i.e., each of the words "sleep," "have a meal," "stay," etc., is calculated.
  the set I of all of the words of the voice-signal transcription not belonging to the vocabulary space is determined: I="bunk,"
  word-embedding by composition is performed for the word "bunk" in a vocabulary space referred to as Vunk,
  unknown words are projected in a common space (Vms U Vunk), and the N-best candidates are selected, considering the semantic distance and/or measures of similarity,
  considering criteria (time, cost, performance) defined by the user, the candidate word is selected. In this example, the word "sleep" will be retained, and
  the transcription is modified by replacing the word of the transcription with the at least one word in order to obtain a modified signal transcription MTSv: "Where can I sleep cheaply?"

The transcription of the modified signal is then injected, as a question Q, into the semantic engine 400, and the adequate response A is obtained.

Of course, the present disclosure is not limited to the embodiments described above, and a number of developments can be made to the embodiments, without departing from the scope of the invention as defined by the claims. Moreover, the various features, types, variants, and embodiments of the present disclosure may be associated with one another, in accordance with various combinations, insofar as they are not mutually incompatible or exclusive.

The invention claimed is:

1. A method for modifying a voice-signal transcription generated by an automatic speech recognition engine from a voice signal, prior to a generation of a response by a semantic engine from an injection of a question, the semantic engine being equipped with at least one ontology comprising a vocabulary space, the modification method comprising:
  determining a set of all words of the voice-signal transcription not belonging to the vocabulary space, for each word of the determined set:
    word-embedding the word in the vocabulary space,
    determining one or more distances between the word-embedding of the word and each of the words of the vocabulary space,
    selecting at least one word of the vocabulary space, according to the distances determined,
    modifying the transcription by replacing the word of the transcription with the at least one selected word to generate a modified signal transcription,
    injecting the modified transcription into the semantic engine, and
    generating, via the semantic engine, a response to the modified transcription.

2. A method for generating a response to a voice signal, comprising a step of generating a voice-signal transcription by way of an automatic speech recognition engine from words, starting from a voice signal, generating the response by way of a semantic engine from an injection of a question, the semantic engine being equipped with at least one ontology comprising a vocabulary space, the method further comprising modifying the voice-signal transcription according to claim 1 so as to obtain a modified signal transcription, the question injected into the semantic engine being the modified transcription.

3. A device for modifying a voice-signal transcription generated by an automatic speech recognition engine from a voice signal, prior to a generation of a response by a semantic engine from an injection of a question, the semantic engine being equipped with at least one ontology comprising a vocabulary space Vms, the modification device being configured to:
    determine a set of all of the words of the voice-signal transcription not belonging to the vocabulary space, and
    for each word of the determined set:
        performing word-embedding of the word in the vocabulary space,
        determining semantic distances between the word-embedding of the word and each of the words of the vocabulary space,
        selecting at least one word of the vocabulary space,
        modifying the transcription by replacing the word of the transcription with the at least one selected word in order to generate a modified signal transcription,
        injecting the modified transcription into the semantic engine, and
        generating, via the semantic engine, a response to the modified transcription.

4. A system for generating a response to a voice signal, comprising:
    an automatic speech recognition engine configured to generate a voice-signal transcription from the voice signal,
    a semantic engine configured to generate the response from in response to an injection of a question, the semantic engine being equipped with at least one ontology comprising a vocabulary space, and
    a device according to claim 3, configured to generate a modification of the signal transcription, and to inject the modified transcription into the semantic engine.

5. A non-transitory computer readable storage medium storing instructions thereon that, when executed by at least one processor, cause the at least one processor to perform acts comprising:
    determining a set of all words of a voice-signal transcription not belonging to a vocabulary space of a semantic engine, the voice-signal transcription generated by an automatic speech recognition engine from a voice signal prior to a generation of a response by the semantic engine from an injection of a question,
    for each word of the determined set:
        word-embedding the word in the vocabulary space,
        determining one or more distances between the word-embedding of the word and each of the words of the vocabulary space,
        selecting at least one word of the vocabulary space, according to the distances determined,
        modifying the transcription by replacing the word of the transcription with the at least one selected word to generate a modified signal transcription, and
        injecting the modified transcription into the semantic engine.

6. A non-transitory computer readable storage medium storing instructions thereon that, when executed by at least one processor, cause the at least one processor to perform acts comprising:
    generating a voice-signal transcription by way of an automatic speech recognition engine from words,
    starting from a voice signal, generating the response by way of a semantic engine from an injection of a question, the semantic engine being equipped with at least one ontology comprising a vocabulary space,
    modifying the voice-signal transcription according to claim 1 so as to obtain a modified signal transcription, the question injected into the semantic engine being the modified transcription.

* * * * *